US012700277B1

(12) United States Patent
Plomer

(10) Patent No.: US 12,700,277 B1
(45) Date of Patent: Aug. 4, 2026

(54) LOWER MODULE LID FOR RECYCLER TRANSACTION TERMINAL

(71) Applicant: Cardtronics USA, Inc., Atlanta, GA (US)

(72) Inventor: Ryan Plomer, Arbroath (GB)

(73) Assignee: Cardtronics USA, Inc., Atlanta, GA (US)

( * ) Notice: Subject to any disclaimer, the term of this patent is extended or adjusted under 35 U.S.C. 154(b) by 0 days.

(21) Appl. No.: 19/204,766

(22) Filed: May 12, 2025

(51) Int. Cl.
*G07D 11/14* (2019.01)
*G07F 19/00* (2006.01)

(52) U.S. Cl.
CPC ............. *G07D 11/14* (2019.01); *G07F 19/20* (2013.01)

(58) Field of Classification Search
CPC ...... G07F 19/00; G07F 19/201; G07F 19/205; G07D 11/10; G07D 11/12; G07D 11/14
See application file for complete search history.

(56) References Cited

U.S. PATENT DOCUMENTS

2005/0109831 A1 5/2005 Obara et al.
2014/0061222 A1 3/2014 Allan et al.
2024/0169808 A1* 5/2024 Park ..................... G07F 19/203
2024/0362965 A1 10/2024 Stewart

FOREIGN PATENT DOCUMENTS

KR 20220086735 A * 6/2022 ............ G07D 11/12

* cited by examiner

*Primary Examiner* — Laura A Gudorf
(74) *Attorney, Agent, or Firm* — Notaro, Michalos & Zaccaria P.C.; John S. Economou

(57) ABSTRACT

A lid for a lower module in a transaction terminal has a main panel having a central planar area with four opposing sides and formed from a plurality of crossmember elements. A first side panel extends vertically upward on a first side of the central planar area. A second side panel extends vertically downward on a second side of the central planar area that is opposite to the first side. A first end part is connected to a third side of the central planar area of the main panel. The first end part forms an upward facing wall at the third side. A second end part is connected to a fourth side of the central planar area of the main panel. The second end part forms an upward facing wall at the fourth side.

14 Claims, 6 Drawing Sheets

LOWER MODULE LID FOR RECYCLER TRANSACTION TERMINAL

FIELD

The present disclosure relates to a lower module lid for a recycler transaction terminal, and more particularly to a lower module lid for a recycler transaction terminal that is structurally robust to loads applied during use.

BACKGROUND

Transaction terminals such as recycler automated teller machines (ATMs) and self-service terminals (SSTs) include media handling devices. Such media handling devices include an upper media transport with related modules, an intermediate transaction, and a lower transport with related modules. The lower modules are associated with a safe that stores and dispenses notes through the media handling device during transactions at the terminals.

Service is often required on the media handling device for note jams, module failure, etc. and to replenish note stores in cassettes within the lower module. During such service visits, the lower module is necessarily opened and closed (racked out and racked in) to gain access to the cassettes. This movement puts stress on the lower module lid which provides support for the lower module and moves in and out of the terminal along guide rails (slides).

The lower module must be properly aligned with the intermediate module so as to ensure a note jam is unlikely to occur after the service visit. Misalignment of the lower module is a common issue associated with any service that needs performed on the media handling device. Any misalignment can cause the note path to be misaligned and result in note/media jams. In some cases, misalignment can be due to deformation or other damage to the lower module lid caused by excessive re-racking of a module by the service technician following a service visit to the terminal. The misalignment will itself result in an additional service call to remove jammed notes/media and/or replace any broken parts as a result of the excessive re-racking.

Referring now to FIGS. 1 and 2, a lower module lid 100 known in the art is formed from ten different parts, including end parts 110, 112, side panels 120, 122, brace elements 130, 140, support elements 150, 152, and guide rail supports 154, 156. These parts are fastened together with thirty-two (32) fasteners such as screws (not shown). The structural integrity of the lower module lid 100 is controlled by the end parts 101, 112, the side panels 120, 122, the brace elements 130, 140, and support elements 152. Only one part, brace element 140, includes a crossmember element 142 for providing support between the side panels 120, 122 and only provides such support at one end of lower module lid 100. Finite element analysis (FEA) testing of the lower module lid 100 shows that significant deformation can occur due to applied horizontal and vertical loads at corners of the lower module lid 100. Furthermore, the use of thirty-two fasteners extends assembly times and leads to additional deformation when one or more of the fasteners loosen over periods of time. Any deformation of the lower module lid 100 can cause misalignment between the lower module and the intermediate module, resulting in note jams and other problems requiring repeated service calls. FIG. 3 shows a lower module 200 including the lower module lid 100 and the lower module body 210.

Accordingly, there is a need for a lower module lid that is more structurally robust to applied loads, preventing any significant deformation so as to prevent misalignment issues, and which is easier to assemble by requiring less fasteners.

BRIEF DESCRIPTION OF THE DRAWINGS

The following detailed description, given by way of example and not intended to limit the present disclosure solely thereto, will best be understood in conjunction with the accompanying drawings in which.

DETAILED DESCRIPTION

In the present disclosure, like reference numbers refer to like elements throughout the drawings, which illustrate various exemplary embodiments of the present disclosure.

Figure 1:
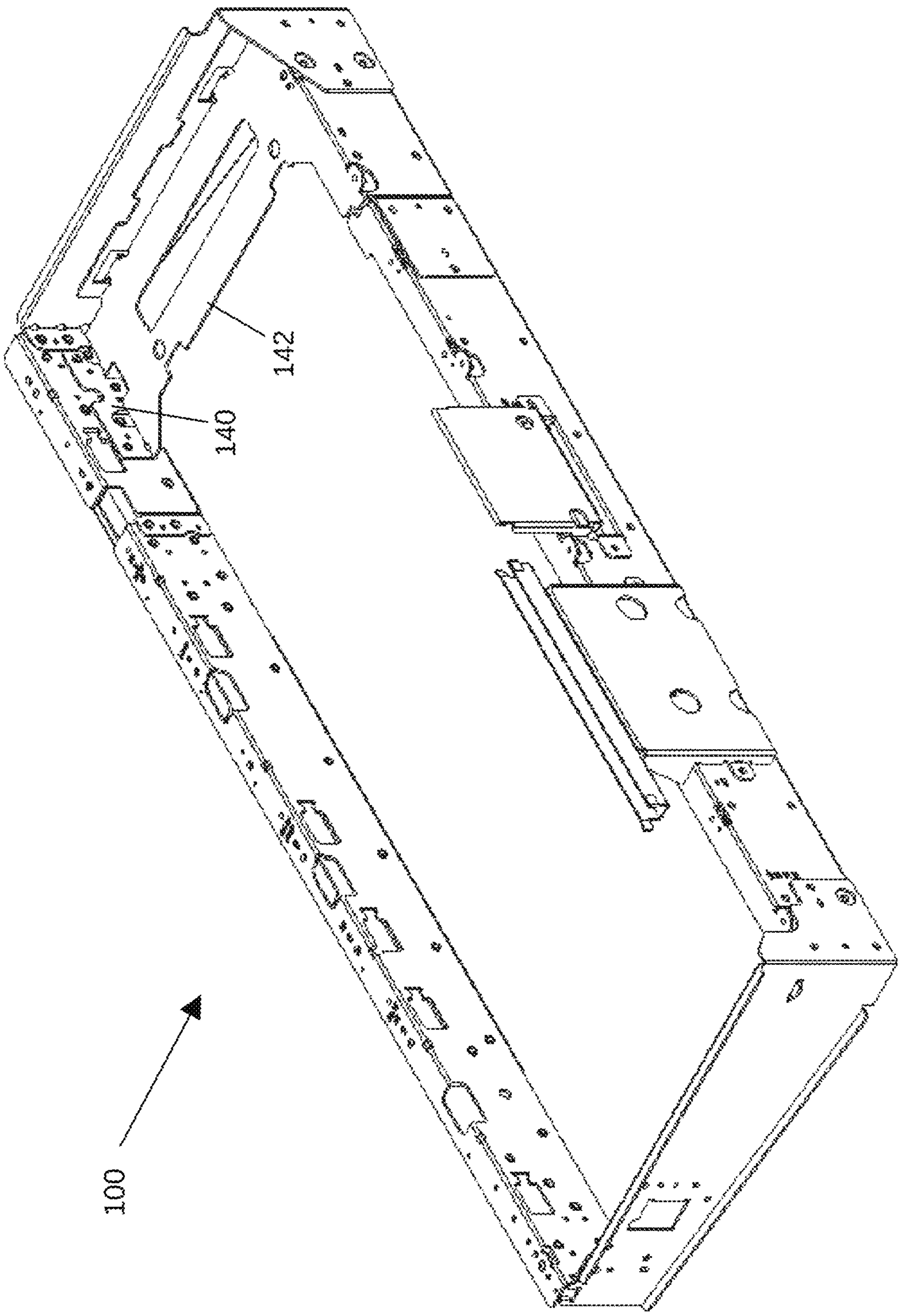
PRIOR ART FIG. 1
FIG. 1 is diagram of a prior art lower module lid in assembled form.
Figure 2:
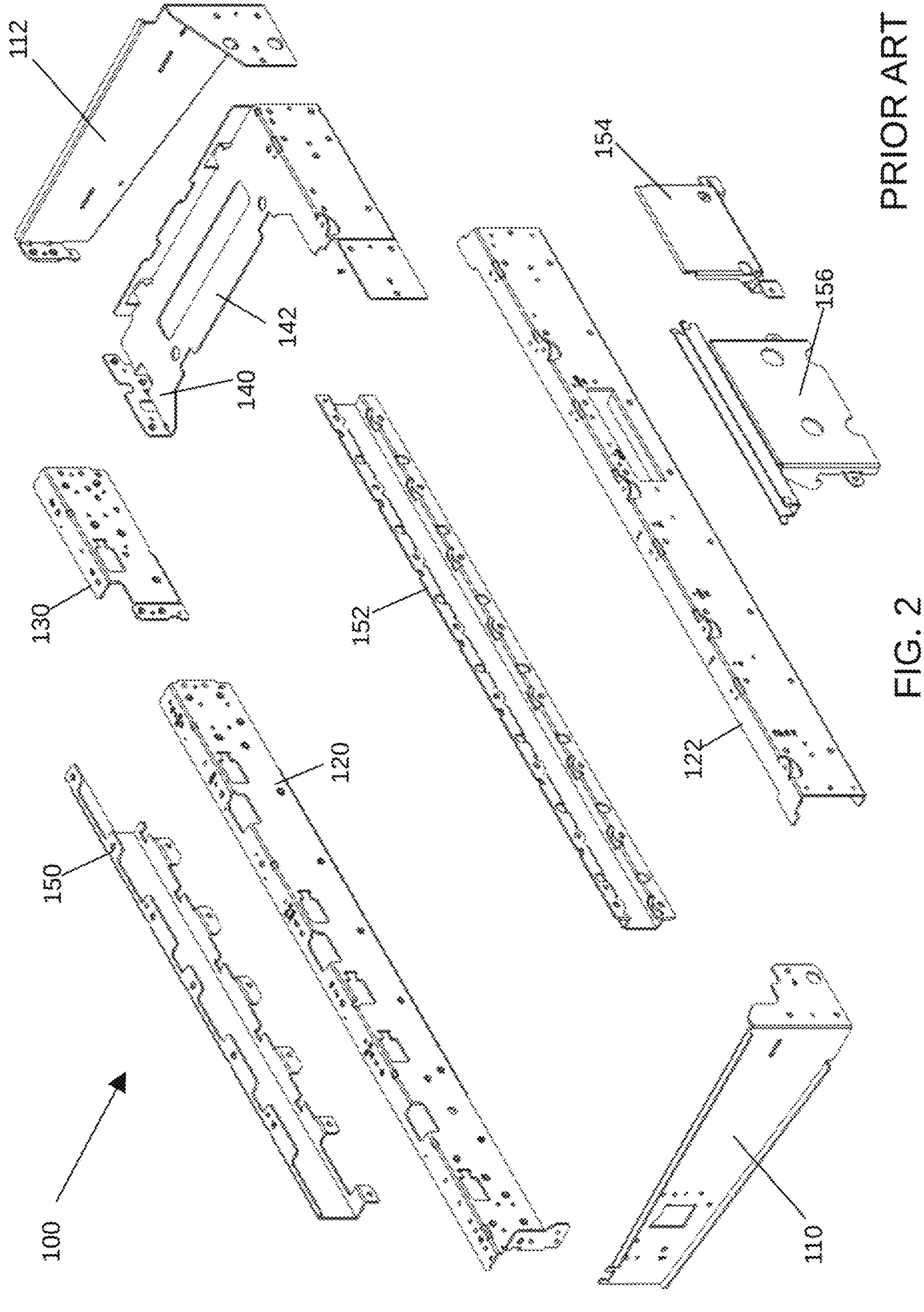
FIG. 2 PRIOR ART
FIG. 2 is diagram of the prior art lower module lid of FIG. 1 in exploded form.
Figure 3:
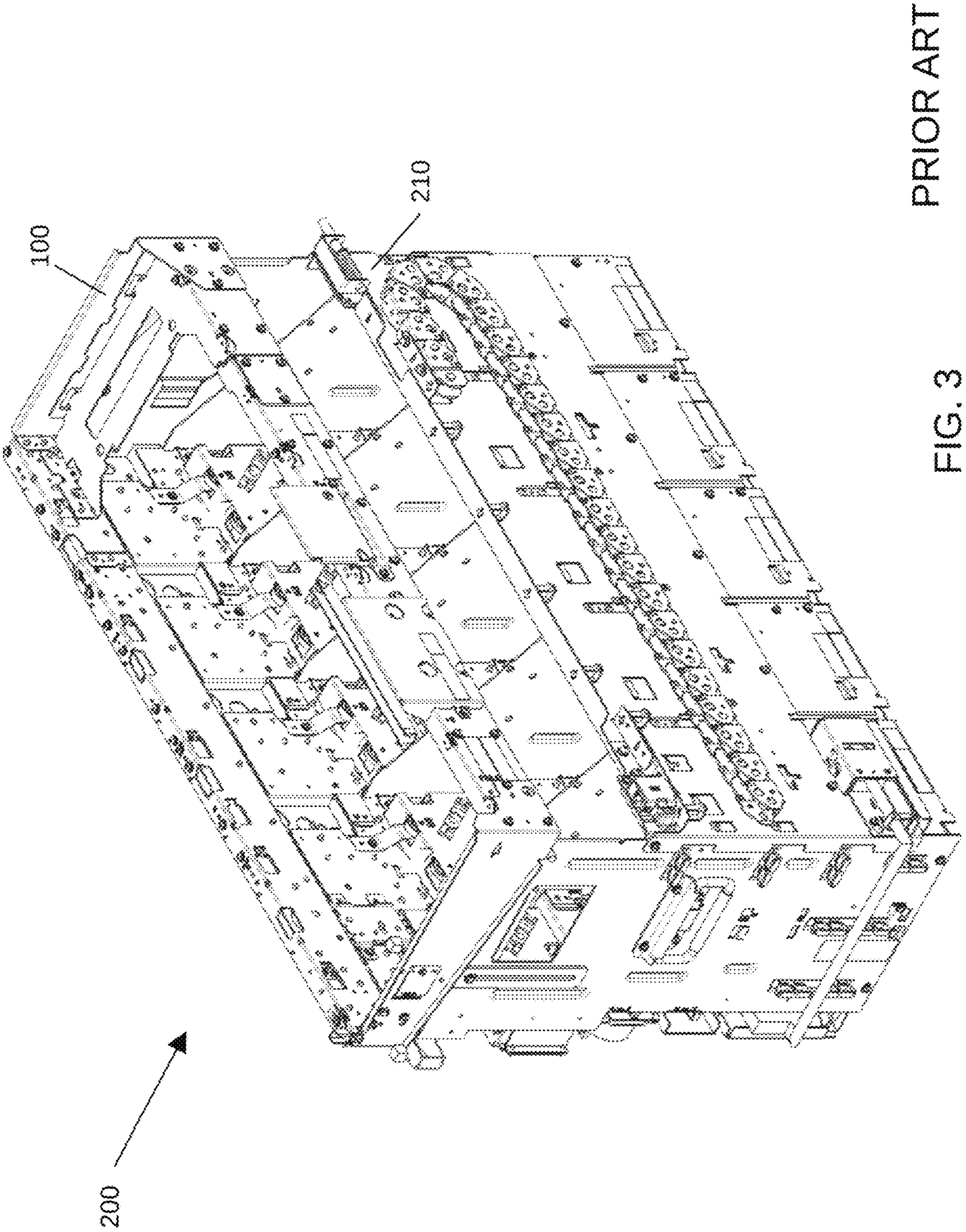
PRIOR ART FIG. 3
FIG. 3 is diagram of a lower module using the prior art lower module lid of FIG. 1.
Figure 4:
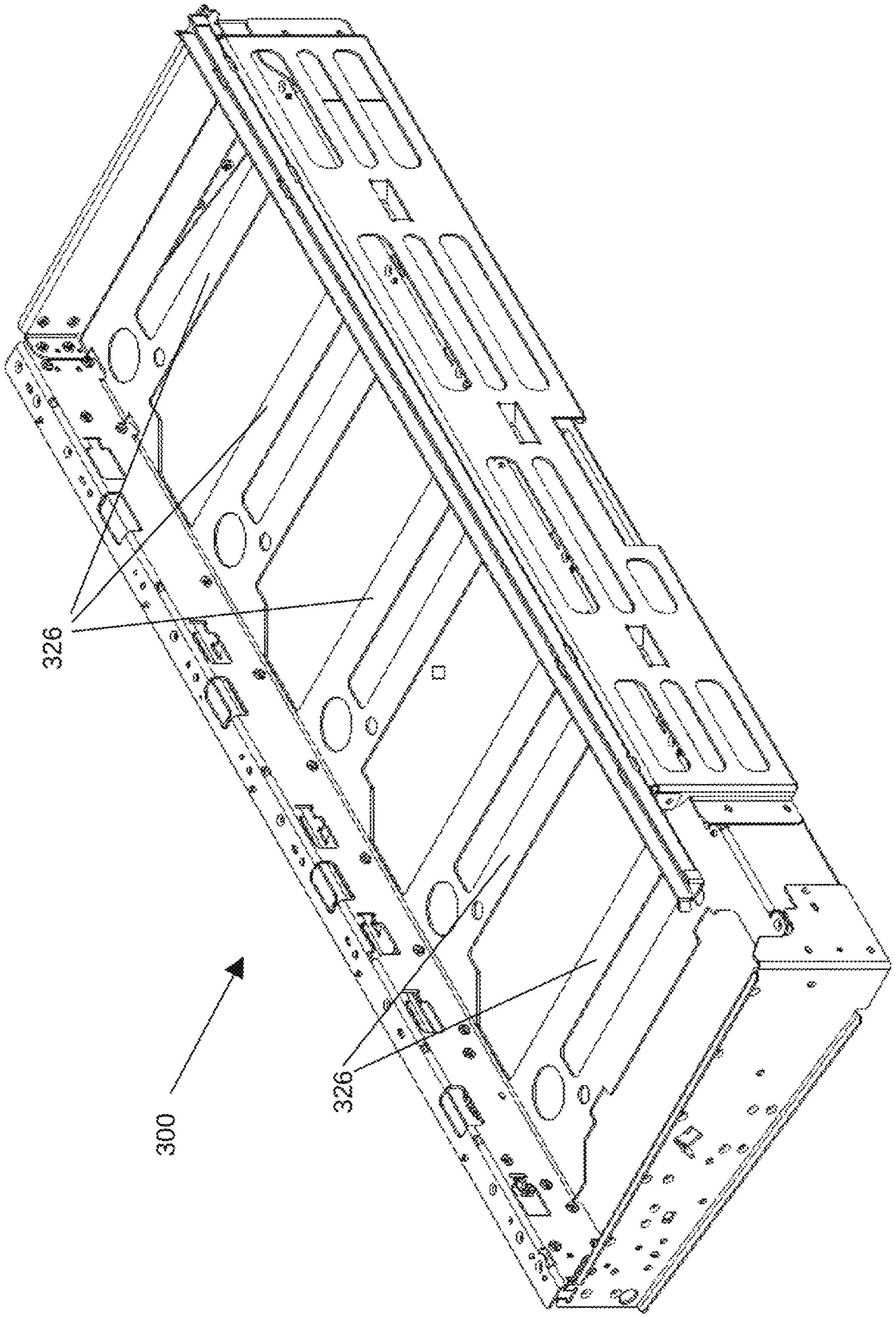
FIG. 4 is diagram of an assembled lower module lid according to the current disclosure.
Figure 5:
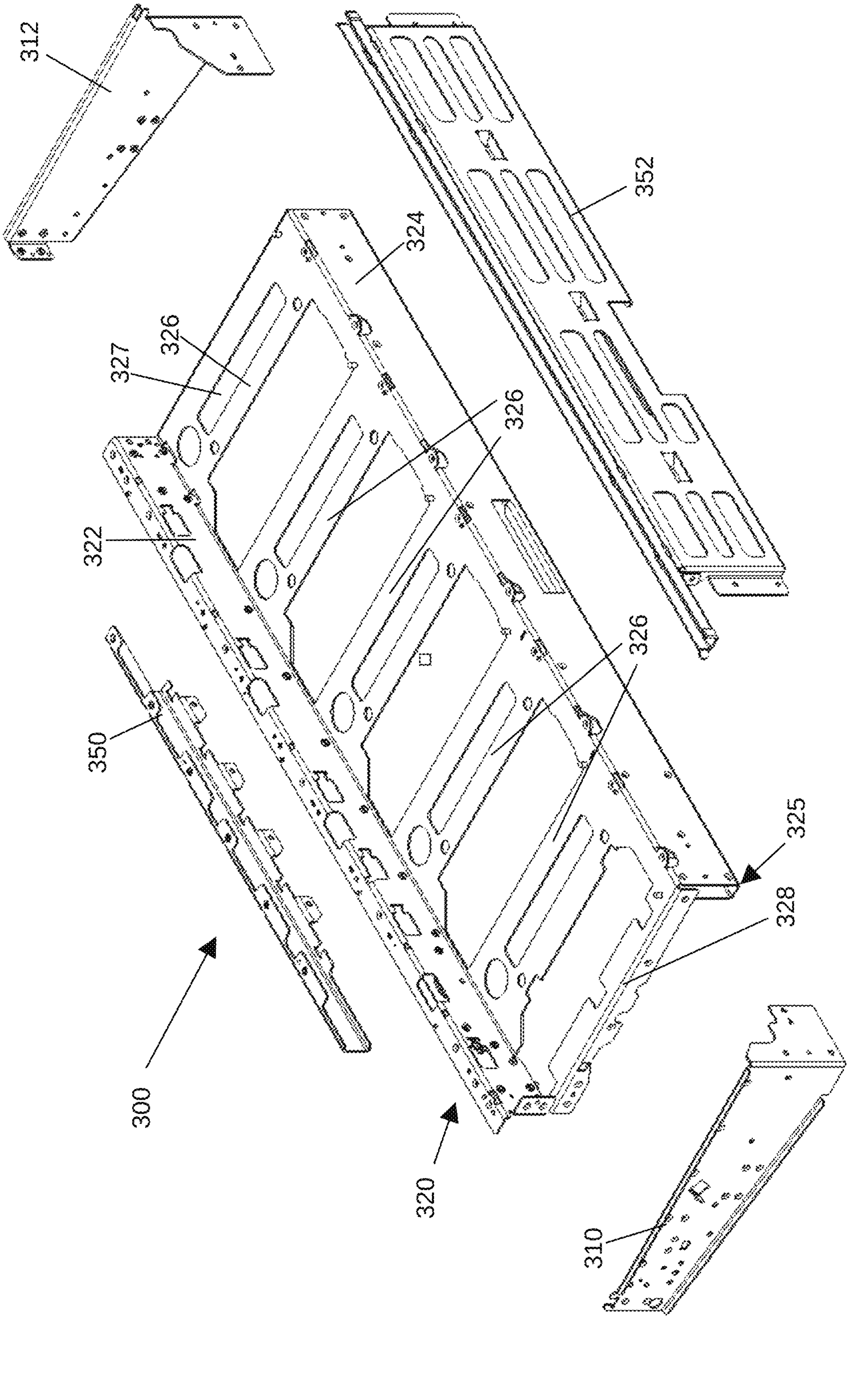
FIG. 5 is a diagram of the lower module lid shown in FIG. 3 in exploded form.
Figure 6:
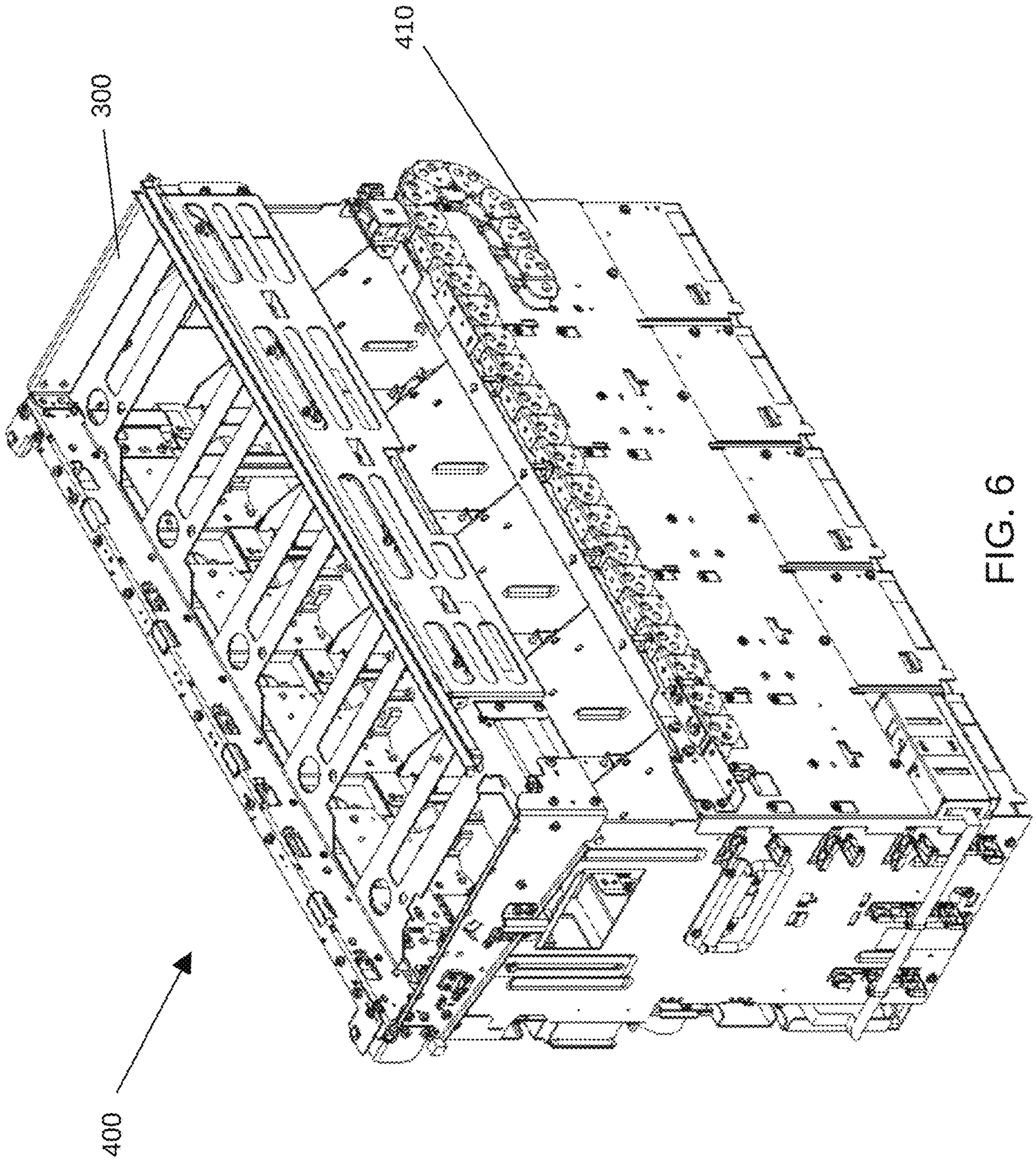
FIG. 6 is diagram of a lower module using the art lower module lid of FIG. 4.

Referring now to FIGS. 4 and 5, a lower module lid 300 has only five separate parts, including a first end part 310, a second end part 312, a main panel 320, a support element 350 and a guide rail support 352. The guide rail support 352 couples to guide elements in the transaction terminal to allow the lower module 400 to move in and out of the associated transaction terminal. By reducing the part count by half, lower module lid 300 requires significantly less fasteners (fifteen) to assemble, reducing assembly time and the number of fastening joints that could loosen over time and cause misalignment issues. The structural integrity of the lower module lid 300 is provided by only three parts, the two end parts 310, 312 and the main panel 320. The main panel 320 is integrally formed from a first side panel 322, a second side panel 324, a plurality of crossmember elements 326, and preferably an end element 328. The end element 328 extends from the first side panel 322 to the second side panel 324 at one end of the main panel 320. In the embodiment shown in FIGS. 4 and 5, six crossmember elements 326 are provided, but in some embodiments more or less such elements may be provided. Also, in the embodiment shown in FIGS. 4 and 5, each crossmember element 326 includes several apertures therein, including a central elongated aperture 327. In other embodiments, such apertures may be omitted. Each of the parts included in lower module lid is preferably formed from structural steel, but equivalent materials may also be used. FIG. 6 shows a lower module 400 including the lower module lid 300 and the lower module body 410.

The main panel 320 includes a central planar area that is preferably rectangular and is formed by the crossmember elements 326 and the end element 328. The main panel 320 also includes a first side panel 322 extending vertically upward from the central rectangular planar area and a second side panel 324 extending vertically downward from the central planar area. The second side panel 324 is preferably formed from a box-section style enclosed section 325. The first side panel 322 couples directly to the crossmember elements 326 and the end element 328 on a first side of the central planar area, and the second side panel 322 couples directly to the crossmember elements 326 and the end element 328 on a second side of the central planar area that is opposite to the first side thereof. The main panel 320 thus provides significantly more structural integrity to the lower module lid 300. First, the ladder structure provided by the crossmember elements 326 adds stiffness for both the torsional and sheer strains. Furthermore, the second side panel 324 is formed in a box-section style enclosed section 325 that adds stiffness for both the torsional and sheer strains. By consolidating a number of separate parts into a single main panel, the robustness and stiffness provided by lower module lid 300 is significantly increased because connections previously present at stress points have been removed.

The first end part 310 is coupled to a first end of the main panel 320 to provide an upwardly extending vertical wall at that first end. The second end part 312 is a mirror image of the first end part 310 and is coupled to a second end of the main panel 320 to provide an upwardly extending vertical wall at that second end. When coupled together, the first end part 310, the second end part 312, and the main panel 320 provide a significant increase in robustness and stiffness over prior solutions.

A comparative FEA study has shown that the lower module lid 300 provides an eighty (80) percent improvement in torsional and shear stiffness over the lower module lid 100. The lower module lid 300 has a significant improvement in resistance to deformity in response to horizontal and vertical forces at corners thereof, including at least forty times less deformation to horizontal forces and at least 4.5 times less deformation to vertical forces. As a result, lower module lid 300 provides a robust structurally sound part that can withstand day to day usage without any deformation that can cause misalignment and resultant service calls to correct jams or other problems. Because the lower module lid 300 includes less parts, it is more efficient to manufacture or purchase, deliver, and store. The lower module lid 300 is also more efficient to assemble based on the significant reduction in parts and fasteners.

Although the present disclosure has been particularly shown and described with reference to the preferred embodiments and various aspects thereof, it will be appreciated by those of ordinary skill in the art that various changes and modifications may be made without departing from the spirit and scope of the disclosure. It is intended that the appended claims be interpreted as including the embodiments described herein, the alternatives mentioned above, and all equivalents thereto.

What is claimed is:

1. A lid for a lower module in a transaction terminal, comprising:
- a main panel having a central planar area with four opposing sides and formed from a plurality of crossmember elements, a first side panel extending vertically upward on a first side of the central planar area, and a second side panel extending vertically downward on a second side of the central planar area that is opposite to the first side;
- a first end part connected to a third side of the central planar area of the main panel, the first end part forming an upward facing wall at the third side; and
- a second end part connected to a fourth side of the central planar area of the main panel, the second end part forming an upward facing wall at the fourth side.

2. The lid of claim 1, wherein the second side panel is formed in a box-section style enclosed section.

3. The lid of claim 1, wherein the plurality of crossmember elements comprises five crossmember elements.

4. The lid of claim 1, wherein the main panel further comprises an end element at one of the third side of the central planar area and the fourth side of the central planar area.

5. The lid of claim 1, wherein the main panel is formed from structural steel.

6. The lid of claim 1, wherein the first end part is formed from structural steel.

7. The lid of claim 1, wherein the second end part is formed from structural steel.

8. The lid of claim 1, comprising a guide rail support element coupled to the second side panel of the main panel.

9. The lid of claim 1, wherein each of the plurality of crossmember elements comprises a central aperture.

10. The lid of claim 9, wherein the central aperture is elongated.

11. The lid of claim 1, wherein at least one of the plurality of crossmember elements comprises a central aperture.

12. The lid of claim 11, wherein the central aperture is elongated.

13. The lid of claim 1, wherein the main panel is integrally formed from the plurality of crossmember elements, the first side panel, and the second side panel.

14. The lid of claim 4, wherein the main panel is integrally formed from the plurality of crossmember elements, the first side panel, the second side panel, and the end element.

* * * * *